May 3, 1960     G. G. BERNARD     2,935,475
WELL TREATING
Filed Dec. 16, 1957
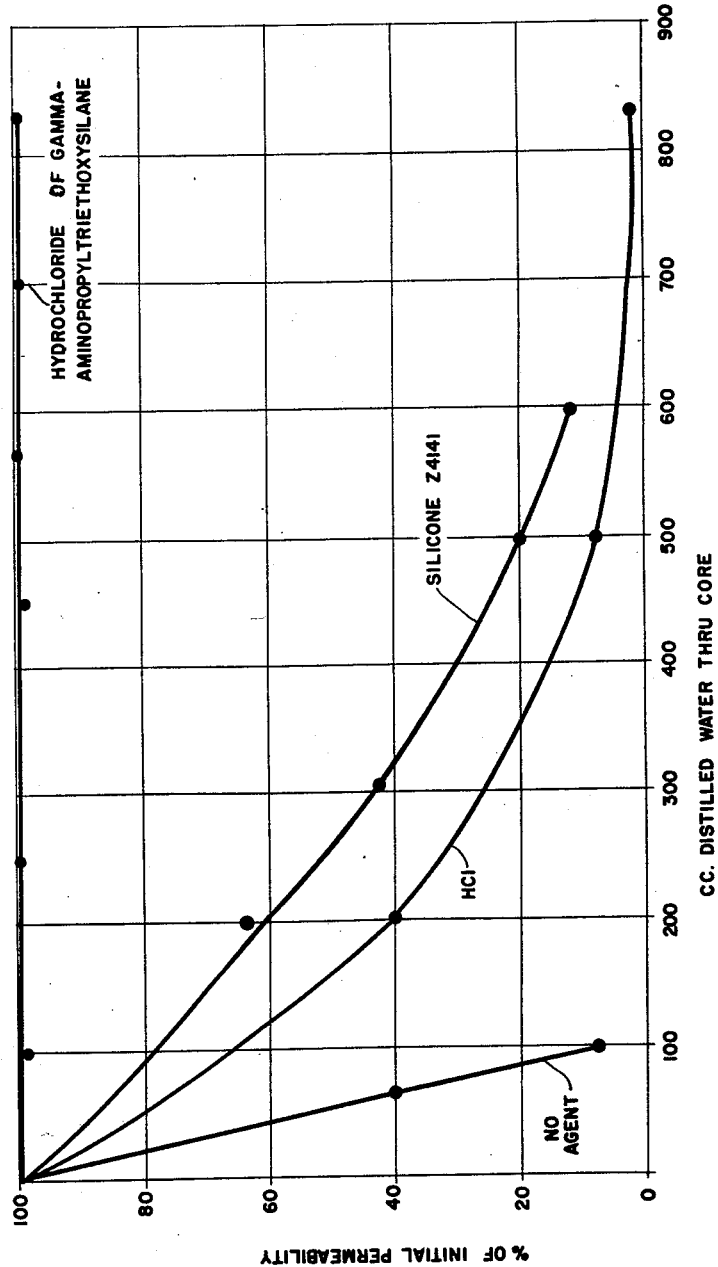
INVENTOR.
GEORGE G. BERNARD
BY
ATTORNEY

United States Patent Office 2,935,475
Patented May 3, 1960

2,935,475
WELL TREATING
George G. Bernard, Crystal Lake, Ill., assignor to The Pure Oil Company, Chicago, Ill., a corporation of Ohio Application December 16, 1957, Serial No. 703,039

8 Claims. (Cl. 252—8.55)

This invention relates to a method for preventing the swelling or dispersion of water-sensitive, clay-containing formations and is more particularly related to a method for preventing swelling of natural geological earth formations and consequent reduction of permeability occasioned by contact of said formations with water.

During the secondary recovery of oil from subterranean, oil-containing formations it is common practice to flood such formations by injecting fresh or non-saline waters into the formation through an injection well in order to drive the oil from the formation to producing wells spaced from the injection well. Where the formation contains clay materials, such as montmorillonite, saponite, hectorite, sauconite, kaolinite, etc., contact with fresh water causes the clay to swell, with resultant reduction in the permeability of the formation and consequent interference with the water flooding operation, because of inability to inject the water at any practical rate.

It has previously been suggested to treat such formations with chemicals which have the ability to inhibit the swelling of the formation. One type of compound which has been used for this purpose is disclosed in a patent to Brown et al., 2,761,842, namely, the N-alkyl substituted cycloamines. Apparently the substituted ammonium ions exchange with the cations of the clay to produce a stabilizing action.

I have discovered that the swelling of clay-containing formations can be inhibited to a remarkable degree by contacting such formations with acid salts of aminoalkyl-alkoxy-silanes prior to contacting the formation with fresh or non-saline water.

It is an object of this invention to provide an improved method for water-flooding natural geological, subterranean, oil-containing formations. Another object of this invention is to provide a method for preventing or mitigating swelling of clay-containing substances. These and other objects will become apparent from the following description and the accompanying drawing, of which the figure is a graphical representation of the effectiveness of the present invention.

Compounds useful in accordance with my invention are represented by the following formula:

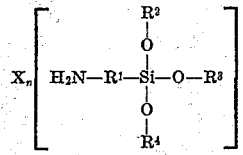

in which X is an inorganic acid, including but not limited to HCl, HBr, HI, $H_2SO_4$, $H_2SO_3$, $H_3PO_4$, $H_3PO_3$, $H_3BO_3$, $H_2B_4O_7$; $n$ is an integer corresponding to the replaceable hydrogens in the acid, $R^1$ is an alkylene group containing 1 to 18 carbon atoms; $R^2$ is an alkyl group containing 1 to 18 carbon atoms; and $R^3$ and $R^4$ are either hydrogen or alkyl groups containing 1 to 18 carbon atoms. Examples of compounds falling within the scope of this invention are hydrochlorides, hydrobromides, etc., of gamma-amino-propyltriethoxysilane, delta-aminobutylmethyldiethoxysilane, gamma - aminopropyl-trimethoxysilane, and gamma-aminopropyltributoxysilane.

Where the invention is employed in the secondary recovery of oil from subterranean, oil-containing formations, the anti-swelling agent is brought in contact with the formation prior to water-flood by injecting an aqueous solution of the agent through an injection well into the formation. For this purpose I prefer to use an aqueous sodium chloride solution acidified with an inorganic acid and containing from about 0.5 to 5% by weight of the aminoalkylalkoxysilane. In carrying out the preliminary treatment of the formation, it is necessary only to wet the radial zone immediately adjacent to the injection and/or the producing well for a distance of approximately 5–15 feet from the well bore. An amount of solution equivalent to about 1–10 times the pore volume of the zone to be treated will be effective in mitigating the swelling and the consequent reduction in permeability of the formation.

In order to demonstrate the effectiveness of the invention in preventing decrease in permeability of a clay-containing formation, a series of experiments was performed using synthetic cores as test specimens. Cores 1" in diameter and 1" long were mounted in conventional core holders. These cores were prepared by intimately mixing 80 parts of finely-divided silica with 2 parts of montmorillonite clay and about 10–20 parts by weight of a thermoplastic resin, such as Lucite or other acrylic resin, to bind the sand and clay into a firm mass. The mixture was then heated to a temperature of about 120° F. and subjected to a pressure sufficient to cause the resin to bind the sand and clay particles into a solid mass. The cores employed in the present investigation contained 2% of clay and the silica (sand) used in preparing the cores had a mesh of 50–70. The method of manufacturing these synthetic cores is more fully described in U.S. application Serial No. 676,188, filed August 5, 1957.

*Example I*

A synthetic core prepared as above-described, and having a permeability of 752 millidarcies, was used in this experiment. One mol of sodium chloride solution was passed through the core initially and the core was determined to have a permeability of 752 millidarcies to the solution. Following this determination, distilled water was passed through the core, whereupon the permeability decreased to 14 millidarcies, thereby indicating that considerable swelling of the clay had occurred.

*Example II*

Another synthetic core having a permeability of 431 millidarcies was treated by flowing through it one liter of an aqueous solution containing 1% by weight of the hydrochloride of gamma-aminopropyltriethoxysilane. Distilled water was thereafter flowed through the core and the core exhibited a permeability of 316 millidarcies to the distilled water.

In order to further demonstrate the efficacy of the anti-swelling agents of this invention, the following series of tests was conducted. A set of synthetic cores made as previously described, and containing 2% montmorillonite, were tested as follows. Distilled water was flowed through the first core, and 100 cc. of 1 molar HCl-water solution was passed through the second core, followed by distilled water. The third core was treated by passing therethrough 400 cc. of an aqueous solution containing 1 mol NaCl, 4% HCl and 1% gamma-aminopropyltriethoxysilane, all by weight, and then followed by flowing distilled water therethrough. The fourth core was treated by flowing therethrough 400 cc. of aqueous solution containing 1 mol NaCl and 1% by weight of silicone Z4141, an ionizable, water-dispersible commercial (Dow-Corning Corp.) silicone compound, the silicone portion of which forms a cation when the compounds is dispersed in water, followed by passing distilled water through the core. The effect of these treatments on the four cores is graphically represented in the accompanying drawing. By reference to the drawing, it will be seen that after the passage of 850 cc. of water through the core first treated with the hydrochloride of gamma-aminopropyltriethoxysilane, substantially no reduction in permeability occurred. In each of the other cases there was a very significant reduction in permeability.

The anti-swelling agents of this invention are water-soluble, as is the silicone Z4141, which was found to be substantially worthless in preventing swelling of the clay.

The instant invention has specific application in conventional water flooding practices and is adaptable for use in a variety of flooding operations, such as circular flood, line-flood, boundary flood or other types of flooding techniques. In applying the treating process of this invention, the conventional injection equipment utilized in the water flooding process can be employed. The respective treating agents can be forced into the injection well through a suitable-diameter tubing disposed in the well-bore and equipped with packers. The tubing is preferably cemented in the cap-rock whereby the treating agents and subsequent flooding water are confined within the well-bore to the interval in which the oil reservoir to be treated is penetrated. In the event that it is preferred to effect the initial dehydration of the rock reservoir by a heat-treatment technique, the heater can be disposed in the well-bore adjacent to the formation which is to be dehydrated in this manner. A variety of electrical or gas-fired burners are described in the prior art for effecting this production of necessary heat.

The flood-water which is employed as the driving force in the water-flooding operation which is carried out subsequent to the treatment of the water-sensitive formation, which is the process of this invention, can be preconditioned to remove or mitigate the plugging effect of contained sediment, or dissolved substances which will form solid materials, which will clog the pore spaces of the rock reservoir. Corrosion inhibitors can also be employed in properly conditioning the fresh flood-water which is injected into the process during the water-flooding process.

Although the invention has been described particularly with regard to treatment of natural geological subterranean formations, it is applicable to treatment of any clay-containing material which is susceptible to swelling upon contact with fresh water.

I claim as my invention:

1. A method for stabilizing the clay content of clay-containing formations in the presence of non-saline water comprising contacting said formations with a solution of at least one acid salt of an aminoalkylalkoxysilane of the formula:

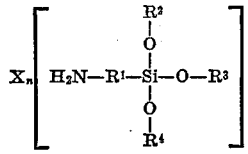

in which X is an inorganic acid, $n$ is an integer corresponding to the number of replaceable hydrogens in said acid; $R^1$ is an alkylene group containing 1 to 18 carbon atoms; $R^2$ is an alkyl group containing 1 to 18 carbon atoms; and $R^3$ and $R^4$ are selected from the group consisting of hydrogen and alkyl groups containing 1 to 18 carbon atoms, prior to contacting the formation with said water.

2. Method in accordance with claim 1 in which said salt is contacted with said formation in the form of an aqueous solution containing from about 0.5 to 10% of said salt.

3. Method in accordance with claim 2 in which the formation contacted surrounds an earth-bore and sufficient solution is forced into said formation through said bore to penetrate the formation for a radial distance of about 5 to 15 feet.

4. Method in accordance with claim 3 in which the salt is the hydrochloride of gamma-aminopropyltriethoxysilane.

5. The method of improving water-flooding of oil-bearing, subterranean formations containing water-swelling clay, comprising wetting the formation prior to injecting the flood-water therein by means of an aqueous solution of an acid salt of an aminoalkylalkoxysilane of the formula:

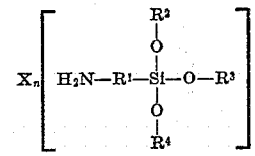

in which X is an inorganic acid, $n$ is an integer corresponding to the number of replaceable hydrogens in said acid; $R^1$ is an alkylene group containing 1 to 18 carbon atoms; $R^2$ is an alkyl group containing 1 to 18 carbon atoms; and $R^3$ and $R^4$ are selected from the group consisting of hydrogen and alkyl groups containing 1 to 18 carbon atoms.

6. Method in accordance with claim 5 in which the solution contains about 0.5 to 10% of the salt.

7. Method in accordance with claim 6 in which the amount of solution used is equivalent to about 1–10 pore volumes of the formation to be wetted.

8. Method in accordance with claim 7 in which the salt is the hydrochloride of gamma-aminopropyltriethoxysilane.

References Cited in the file of this patent

UNITED STATES PATENTS

| | | |
|---|---|---|
| 2,715,133 | Speier | Aug. 9, 1955 |
| 2,761,835 | Brown | Sept. 4, 1956 |
| 2,761,842 | Brown et al. | Sept. 4, 1956 |
| 2,832,754 | Jex et al. | Apr. 29, 1958 |